US012657046B2

(12) United States Patent
Igelka et al.

(10) Patent No.: US 12,657,046 B2
(45) Date of Patent: Jun. 16, 2026

(54) DATA DEDUPLICATION FOR REPLICATION-BASED MIGRATION OF VIRTUAL MACHINES

(71) Applicant: Google LLC, Mountain View, CA (US)

(72) Inventors: Or Igelka, Tel Mond (IL); Ayelet Wald, Petach Tikva (IL)

(73) Assignee: Google LLC, Mountain View, CA (US)

( * ) Notice: Subject to any disclaimer, the term of this patent is extended or adjusted under 35 U.S.C. 154(b) by 777 days.

(21) Appl. No.: 17/977,279

(22) Filed: Oct. 31, 2022

(65) Prior Publication Data

US 2024/0143371 A1     May 2, 2024

(51) Int. Cl.
*G06F 9/455* (2018.01)

(52) U.S. Cl.
CPC .................... *G06F 9/45558* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 11,449,263 B1 * | 9/2022 | Deguchi | ............... | G06F 3/0644 |
| 11,561,714 B1 * | 1/2023 | Mertes | .................. | G06F 3/0604 |
| 11,741,078 B1 * | 8/2023 | Narendra | ............ | G06F 16/2358 |
| | | | | 707/690 |

| | | | | |
|---|---|---|---|---|
| 2018/0285427 A1 * | 10/2018 | Kaplan | ................. | G06F 16/285 |
| 2020/0327098 A1 * | 10/2020 | Gonczi | ............... | G06F 16/1752 |
| 2022/0138115 A1 * | 5/2022 | Klaedtke | ............. | G06F 12/1425 |
| | | | | 711/163 |
| 2022/0342770 A1 * | 10/2022 | Jagannatha | ......... | G06F 11/1451 |
| 2024/0031175 A1 * | 1/2024 | Nebenzahl | ............ | H04L 9/3247 |

OTHER PUBLICATIONS

Thakre et al., "VM Live Migration Time Reduction using NAS based algorithm during VM Live Migration", 2017 IEEE 3rd International Conference on Sensing, Signal Processing and Security (ICSSS), pp. 242-246 (Year: 2017).*

(Continued)

*Primary Examiner* — S. Sough
*Assistant Examiner* — Selena Sabah Nahra
(74) *Attorney, Agent, or Firm* — Lerner David LLP

(57)     ABSTRACT

A migration system provides data deduplication for migrating virtual machines across a network. The system maintains a centralized deduplication dictionary storing key-value pairs of identifiers and corresponding virtual machine data mapped to the identifiers, which are transferred as part of a migrating virtual machine. The migration system can store at least a portion of the virtual machine data, in intermediate storage implemented on one or more storage devices. The intermediate storage is queryable using a hash-generated key of the stored data. After an initial transfer of data from a source computing environment to a target computing environment, a requesting computing environment can subsequently initiate a data transfer by first querying the migration system to determine if the target data has already been transferred and stored in intermediate storage. Instead of resending the virtual machine data from its source computing environment, the migration system initiates the transfer from the intermediate storage.

18 Claims, 7 Drawing Sheets

(56)　　　　　　　References Cited

OTHER PUBLICATIONS

International Preliminary Report on Patentability for International Application No. PCT/US2023/034280 dated May 15, 2025. 8 pages.
International Search Report and Written Opinion for PCT Application No. PCT/US2023/034280, dated Feb. 7, 2024. 14 pages.
Jo, C., et al., "Efficient Live Migration of Virtual Machines Using Shared Storage", Virtual Executiong Environments, Mar. 2013. pp. 41-50.
Zhang, X., et al., "Exploiting Data Deduplication to Accelerate Live Virtual Machine Migration", 2010 IEEE International Conference on Cluster Computing, Sep. 2010., pp. 88-96.
"Fuzzy hashing" [online]. [Retrieved Jan. 5, 2024] Retrieved from the internet: <https://en.wikipedia.org/w/index.php?title=Fuzzy_hashing&oldid=1113166858>. 3 pages.

* cited by examiner

Centralized Deduplication Dictionary
165

410   S1 -> D1 - created at T1, last read at T4, read 7 times so far -> priority 1
420   C1 <-> S1

430   S2 -> D2, M2 - created at T2, last read at T3, read 3 times so far -> priority 3

440   S3 -> D3 - created at T5, never read, read 0 times so far -> priority 4

450   S4 -> D4 - created at T6, last read at T7, read 3 times so far -> priority 2
460   C4 <-> S4

T1   T2   T3   T4   T5   T6   T7

401

DATA DEDUPLICATION FOR REPLICATION-BASED MIGRATION OF VIRTUAL MACHINES

BACKGROUND

During a virtual machine migration, a computing system moves, copies, or clones a virtual machine from a source computing environment to a target computing environment. A computing environment can include processors, memory, and other components or devices for hosting virtual machines.

One type of virtual machine migration is replication-based migration. During replication-based migration, a computing system moves or copies a virtual machine from a source to a target computing environment. The computing system takes virtual machine snapshots of a virtual machine operating in the source computing environment. A virtual machine snapshot is data representing the state of a virtual machine at a given time. Virtual machine snapshots are accessible for reading at any time, even if the state of the corresponding virtual machines and disks has changed. The system replicates and sends the snapshots or differences between snapshots to a target computing environment. Migration ends when the computing system performs a cut-over operation, in which the virtual machine at the source computing environment is shut down, a final snapshot is replicated onto the target computing environment, and a virtual machine at the target computing environment is started.

Replication-based migration of virtual machines can involve migrating repeating data, e.g., the same operating system (OS) files across different virtual machines. Non-OS-related data may also be repeated across virtual machines, for example by virtual machines generated according to a predefined template. Transferring repeating data in different virtual machines is redundant and wastes computing resources, such as network bandwidth and data storage space.

BRIEF SUMMARY

Aspects of the disclosure provide for data deduplication for migrating virtual machines across a network. In accordance with aspects of the disclosure, a virtual machine migration system maintains a centralized deduplication dictionary storing key-value pairs of identifiers and corresponding virtual machine data mapped to the identifiers. The migration system can store at least a portion of the virtual machine data, e.g., a virtual machine snapshot or a block of data transferred as part of a virtual machine migration, in intermediate storage implemented on one or more storage devices that are part of the system. The intermediate storage is queryable using a hash-generated key of the stored data. After an initial transfer of data from a source computing environment to a target computing environment, a requesting computing environment can query the migration system to determine if the target data has already been transferred and stored in intermediate storage. Instead of resending the virtual machine data from its source computing environment, the migration system initiates the transfer from the intermediate storage.

The migration system can be implemented in a centralized environment, such as a cloud computing platform. The migration system can be better equipped to store and transfer repeated data during a virtual machine migration removing the load and storage costs from other computing environments. These other environments, such as a private or enterprise network, may be more computing resource-constrained, e.g., because of limited network upload bandwidth. In addition, because the migration system can service multiple source and target computing environments, the system gains a broader picture of the popularity of commonly transferred data. By determining commonly transferred data, the system can prioritize that data for intermediate storage. The intermediate storage is accessible by computing environments for the virtual machine data, avoiding the need to retrieve data from a source computing environment with each iteration of migration.

The system can identify data popularity, for example, through received metadata. The metadata can at least partially measure usage attributes of virtual machine data, such as how frequently the data is accessed, or the last time the data was accessed in response to a query to the migration system. The system can implement a cache layer to serve as a proxy for deduplicating data transfers across multiple migrating virtual machines.

Aspects of the disclosure provide for a system for virtual machine migration, the system including one or more processors and one or more storage devices, the one or more processors configured to: receive a key corresponding to virtual machine data; determine, using a data structure mapping keys with respective virtual machine data stored in one or more storage devices, that the received key matches a key in the data structure within a predetermined threshold of similarity; and in response to at least the determination, cause the virtual machine data to be transmitted from the one or more storage devices to a target computing environment.

Aspects of the disclosure provide for a method for virtual machine migration, the method including: receiving, by one or more processors, a key corresponding to virtual machine data; determining, by the one or more processors and using a data structure mapping keys to respective virtual machine data stored in one or more storage devices, that the received key matches a key in the data structure within a predetermined threshold of similarity; and in response to at least the determining, causing the virtual machine data to be transmitted from the one or more storage devices to a target computing environment.

Aspects of the disclosure provide for one or more non-transitory computer-readable storage media encoding instructions that are operable, when executed by one or more processors, to cause the one or more processors to perform operations including: receiving, by the one or more processors, a key corresponding to virtual machine data; determining, by the one or more processors and using a data structure mapping keys to respective virtual machine data stored in one or more storage devices, that the received key matches a key in the data structure within a predetermined threshold of similarity; and in response to at least the determining, causing the virtual machine data to be transmitted from the one or more storage devices to a target computing environment.

The foregoing and other implementations can each optionally include one or more of the features, alone or in combination. One implementation includes all the following features in combination.

The virtual machine is hosted in a source computing environment, and wherein the one or more processors are further configured to: determine that the received key does not a match a key stored in the data structure within the predetermined threshold of similarity, and in response, cause the virtual machine data to be transmitted from the source computing environment to the target computing environment; update the one or more storage devices to store the virtual machine data; and update the data structure to map the received key to the virtual machine data.

The key is received from a querying device from either the source computing environment or the target computing environment.

The one or more processors are further configured to: determine that the received key does not match a key stored in the data structure, and in response cause the virtual machine data to be transmitted to the one or more storage devices; and update the data structure to map the received key to the virtual machine data.

The one or more processors are further configured to: receive a query for virtual machine data, the query including a key; and respond to the query with the virtual machine data stored in the one or more storage devices and mapped to the key in the query.

The one or more processors are further configured to: populate a cache layer storing one or more entries of the data structure, each entry including one or more keys and respective data mapped to the one or more keys, wherein in populating the cache layer, the one or more processors are configured to prioritize entries of the data structure for caching based on values for usage attributes of virtual machine data stored in the one or more storage devices.

A key in the data structure is output of a hash function receiving at least part of the virtual machine data as input, and wherein a plurality of keys is mapped to the virtual machine data, each key generated using a respective hash function.

The one or more processors are further configured to: receive a second key different than the received key and corresponding to the virtual machine data, and determine that the second key matches a key in the data structure mapped to the virtual machine data within the predetermined threshold of similarity; and wherein in causing the virtual machine data to be transmitted, the one or more processors are configured to cause the virtual machine data to be transmitted at least in response to the determination that the second key matches the key in the data structure within the predetermined threshold of similarity.

The received key is generated using a first hash function, and the second key is generated using a second hash function, and wherein the cross-probability of a hash collision occurring on the same input in both the first hash function and the second hash function is below a predetermined tolerance.

The system further includes one or more second storage devices, and wherein the one or more processors are further configured to: determine that the virtual machine data is stored in the target computing environment and in the one or more storage devices, and in response to the determination, cause the virtual machine data to be stored only in the one or more second storage devices.

DETAILED DESCRIPTION

Overview

Figure 1:
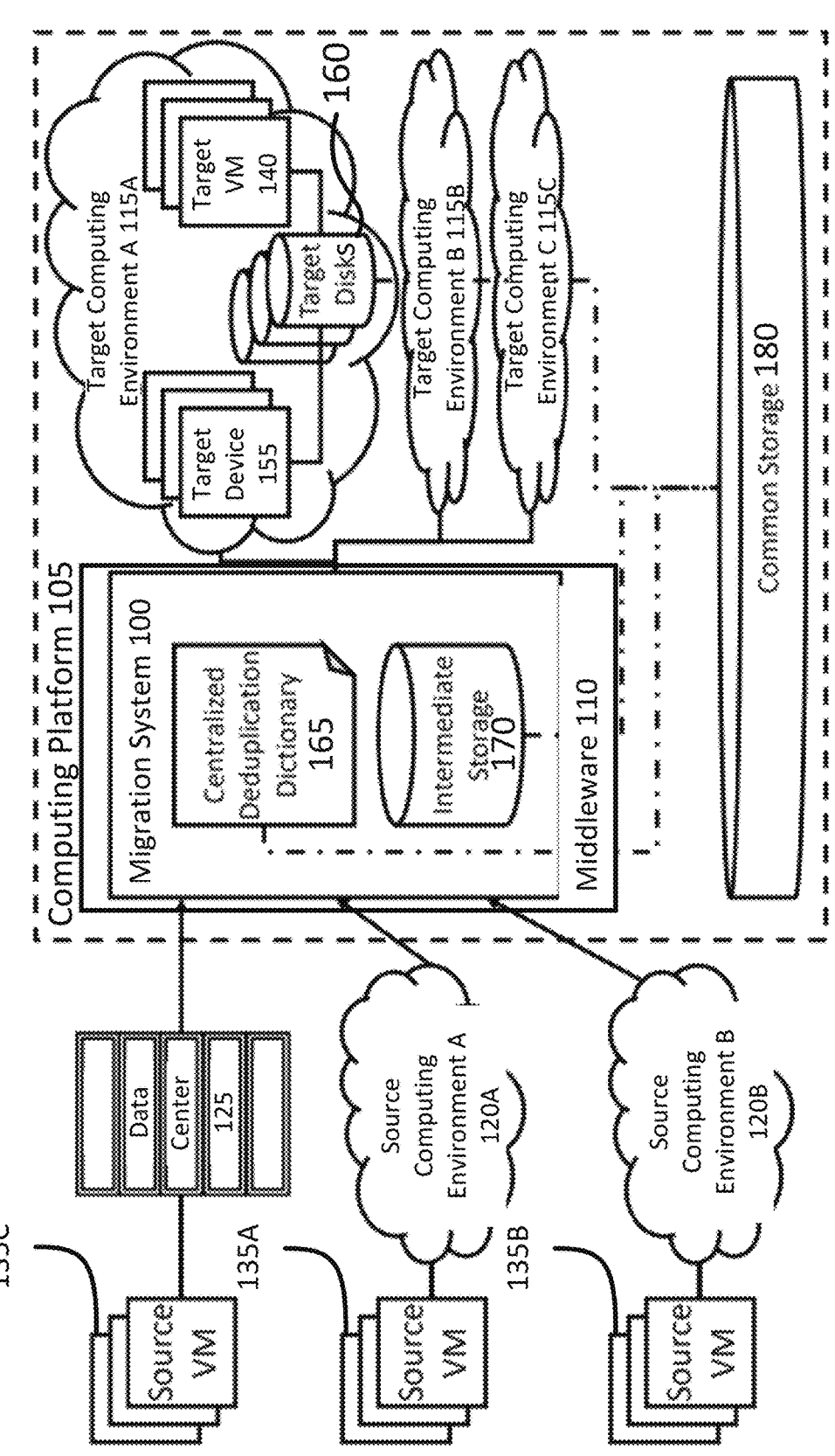
FIG. 1 is a block diagram of a migration system of a computing platform implementing data deduplication for migration of virtual machines, according to aspects of the disclosure.

A virtual machine migration system can perform data deduplication operations to mitigate redundant data transfer and save storage space and network bandwidth during virtual machine migration. A migration system, such as on a platform maintained by a cloud provider, can facilitate the migration of virtual machines from a source computing environment to a target computing environment. The system can maintain a data structure, such as a dictionary, of (key, virtual machine data) pairs or (key, virtual machine, metadata) tuples. The key refers to a dictionary or other queryable data structure key. The value associated with the key is the data or a tuple of (data, metadata). A key can be a hash of virtual machine data, which can be raw data, compressed data, one or more files, folders, data structures, data blocks, etc. The dictionary can include a set of keys that are mapped to corresponding virtual machine data. Multiple keys may be mapped to the same virtual machine data.

The system can maintain a centralized deduplication dictionary and intermediate storage for storing virtual machine data during migration, reducing, or eliminating the need for source or target computing environments to coordinate and synchronize data transfers to avoid data duplication. After a source computing environment transfers a virtual machine data, e.g., a virtual machine snapshot to a target computing environment, the migration system can store virtual machine data in intermediate storage. A computing device can query the system for virtual machine data and cause the virtual machine data to be transferred from the system's intermediate storage, instead of from the source computing environment from which the virtual machine data originated. In some examples, a source computing environment uploads new virtual machine data directly to the migration system, which provides the data to a target computing environment in response to a query.

Data deduplication operations are operations that are performed by an appropriately configured device to reduce the storage space of duplicate data and/or to reduce the amount of network communication required to transmit some data from a source to a target computing environment.

In some examples, the system may be a centralized platform maintained by a cloud provider. The platform may at least in some instances be better positioned for transferring data than a source computing environment initiating a transfer request. The latter may be an enterprise or personal network, for example, which may have fewer computational resources, e.g., processing capability, memory/network bandwidth, etc., than the platform. Aspects of the disclosure eliminate or mitigate potential bottlenecks in the network bandwidth and local computing resources for a computing environment, by eliminating redundant data transfer.

Instead, after querying the system, a computing environment can cause the system to transfer data on its behalf.

Aspects of the disclosure reduce or eliminate the need for storing data structures for data deduplication at both a source and a target computing environment of a virtual machine migration. Requiring synchronized data deduplication mechanisms increases the storage costs and requires matching synchronization mechanisms in environments that may be operated by separate entities. In addition, the system can consolidate commonly used virtual machine data across multiple instances of virtual machine migration, rather than just virtual machine data migrated between a particular source and target computing environment. The system can potentially improve the speed and efficiency of migration if an unrelated virtual machine migration also uses the same virtual machine data, which the system can store in a cache or intermediate storage.

The system can maintain multiple keys as hashes of virtual machine data stored in the intermediate storage. Queries to the system for the presence or absence of virtual machine data in intermediate storage may be sent according to the hash collision rate of the various hash functions used to generate the keys. A key generated from a hash function with a higher hash collision rate relative to other functions, e.g., CRC-32 ("32-bit Cyclic Redundancy Check") relative to SHA-256 ("256-bit Secure Hash Algorithm"), can be used first to query for the presence of a corresponding virtual machine data. As hash functions with higher hash collision rates are generally less computationally expensive to execute, the query/response round trip is more efficient overall, e.g., in terms of processing cycles used to generate and send the query, or the overall wall-clock time taken to perform operations for generating and sending the query.

Because a positive query return may be due to a collision with other virtual machine data stored by the system, a second query can be initiated using a key generated from a hash with a lower hash collision rate. The second query can hedge the risk of collision and accurately determine whether the virtual machine data is in intermediate storage. For example, hash functions can be chosen with the goal of minimizing or eliminating the cross-probability of hash collision for the same input by the selected hash functions.

In some examples, potential hash collisions can be mitigated or eliminated by using a challenge mechanism, as described herein. The migration system or a querying device at a computing environment can compare data, or portions of data, stored in the intermediate storage against a local copy, to test raw data as opposed to just a hash of the data in the form of a key. The challenge mechanism has several applications, depending on the device sending the challenge. For example, a device from a target computing environment can compare raw data or a hash of the data from both the intermediate storage and the source computing environment to verify that the data is correct. In the example in which a source computing environment sends the virtual machine data to the target computing environment, the check is performed to determine if the target computing environment needs to populate the dictionary with the received data.

As another example, a source computing environment has some virtual machine data to send to a target computing environment. The source computing environment issues a challenge to the system to determine if the target virtual machine data is already in the dictionary. The challenge can include comparing the local source copy of the data against the relevant entry in the dictionary if the entry exists.

As another example, the source computing environment may be pre-filling the dictionary with virtual machine data to be later retrieved by a target computing environment. The source computing environment may do this as an alternative to sending the virtual machine data directly to the target computing environment, for example because the virtual machine data is likely to be sent multiple times during a migration. The source computing environment can issue a challenge to the intermediate storage to check if the target virtual machine data is already stored. If not, the source computing environment can upload a copy of the virtual machine data to intermediate storage, to be later retrieved by a target computing environment. In this example, the target computing environment may also issue a challenge to the intermediate storage to check if the requested virtual machine data has been uploaded, before requesting the virtual machine data from the source computing environment.

To further mitigate computational overhead from the generation and querying of keys using different hash functions, computing environments can upload new virtual machine data as entries to be stored in intermediate storage on the system according to their computing resource availability. For example, some target computing environments may have dedicated computing resources, e.g., one or more computing devices, configured to generate keys and upload common virtual machine data to the system for intermediate storage, alleviating more resource-constrained source computing environments.

The system and/or source or target computing environments can use metadata quantifying various attributes of the transferred virtual machine data to determine which data should be prioritized for uploading to or remaining in intermediate storage or cache memory.

As an intermediary between multiple instances of virtual machine migration, the system can collect metadata measuring or quantifying usage attributes of data being transferred. The metadata and other information can be used to prioritize data added to a cache layer that selectively caches some commonly transferred blocks of data for deduplication. The selective caching can be based on one or more factors, with the overall goal being to balance the cost of the size of the cache, with the performance gains of reducing network congestion and local computing resource usage for source or target computing environments. Source or target computing environments can also provide additional data by way of predetermined prioritization of different virtual machine data, e.g., which virtual machine data are likely to be transferred more often, for upload to the intermediate storage or cache layer. The system can use the same prioritization mechanism to determine which entries in the intermediate storage or cache layer to delete, making room for new entries.

The system can also provide common storage of data written to multiple disks in a target computing environment, allowing for deduplication of the data to the disks. Data copies can be written in common storage so that duplicates are not maintained in either the source computing environment, the target computing environment, or the intermediate storage. The common storage can be used to reduce the computational overhead of repeatedly decompressing or compressing data that may be performed as part of synchronizing data across multiple migrating virtual machines, in some examples.

Example Systems

FIG. 1 is a block diagram of a migration system 100 of a computing platform 105 implementing data deduplication for migration of virtual machines, according to aspects of the disclosure. The computing platform 105 can be a collection of computing devices, such as servers, in one or more physical locations and connected over a network to one or more other computing devices. For example, the computing platform 105 can be a cloud computing platform accessible by different computing devices over the internet or other network. The platform can run software accessible to other devices over the internet or network. The computing platform 105 can implement target computing environments, e.g., target computing environments 115A-115C.

As shown in FIG. 1, the computing platform 105 can be in communication with source computing environments 120A-B and implement target computing environments 115A-C. One or more of the source computing environments and/or the target computing environments may be implemented in one or more different physical locations, for example across different platforms or data centers. For example, data center 125 may be implemented as an on-premises source computing environment, relative to an entity, such as an individual or organization like a company or enterprise that maintains the data center 125. The computing platform 105 may be maintained by a cloud provider. In some examples, a target computing environment may be implemented as part of the platform 105 as shown in FIG. 1 or implemented as one or more devices in a system separate from the platform 105.

Middleware 110 can implement migration system 100. Middleware 110 can include, for example, one or more physical computing devices and/or one or more virtual machines configured to perform virtual machine migration. The middleware 110 can include servers but may vary from example-to-example. The software running on the computing platform 105 can include applications or services running in virtual machines. In some examples, the computing platform 105 is a containerized environment running containers on bare metal architecture or in virtual machines.

In different examples, the middleware 110 can be part of a source computing environment or a target computing environment. In some examples, the middleware 110 can be external to both the source and target computing environments, e.g., as shown in FIG. 1, part of the platform 105. The physical location of the middleware 110 need not be physically central to devices implementing source and target computing environments. For example, the middleware 110 may be implemented as devices physically closer to a source computing environment or physically closer to a target computing environment.

The migration system 100 is configured to perform a migration of a virtual machine from a source computing environment to a target computing environment. In FIG. 1, the source computing environments 120A-B, and data center 125 include source virtual machines 135A-135C, respectively. The underlying software, hardware, and/or firmware to implement the migration system 100 can be implemented across a combination of devices in a source computing environment, target computing environment, and the computing platform 105. In some examples, parts of the migration system 100 are deployed in various computing environments, to configure the computing environments to query the migration system 100, transfer data from source to target computing environment, and/or to upload virtual machine data to intermediate storage 170 or common storage 180.

For example, a computing environment can deploy a virtual machine, an agent, or some software running on bare metal or in a virtual machine, that at least partially implements the migration system 100 according to aspects of the disclosure. Part of the deployment can include instructions for causing a device in the computing environment to issue a challenge to the migration system 100 before uploading to the intermediate storage 170 or sending the data to a target computing environment. The instructions provided can depend on whether the computing environment is operating as a source computing environment or a target computing environment.

FIG. 1 shows target virtual machine 140 deployed in target computing environment A 115A. Other target virtual machines may be deployed in the target computing environments 115B-C. One or more of the migration system 100, source virtual machines 135A-C, and target virtual machines 140A can be deployed with computing resources including a processor, memory, and storage device, as described herein with reference to FIG. 7.

Target computing environment A 115A can also include one or more target devices 155. The target device 155 can be configured to implement an interface between the target computing environment A 115A and other components shown in FIG. 1. In some examples, the migration system 100 can be at least partially implemented in the target device 155. The migration system can perform one or more processes including processes 500, 600, described with reference to FIGS. 5-6.

Migration system 100 can include a centralized deduplication dictionary 165, which can map keys to virtual machine data stored in intermediate storage 170. Intermediate storage 170 can be implemented across one or more storage devices, e.g., disks, solid state drives, etc. Implementing the dictionary 165 in middleware 110 can make deduplication more effective, as the system 100 observes a wider range of data and gains a broader picture of what virtual machine data is more popular, e.g., more frequently migrated, than others. This is at least because virtual machine data for all migrating virtual machines, e.g., from each of source computing environments 120A-B and data center 125, pass through the migration system 100.

Virtual machine data refers to any data that can be transferred from a source computing environment to a target computing environment during a virtual machine migration. Virtual machine data can be transferred or processed in data blocks. The block size can be uniform or vary from block-to-block. The block size may be predetermined before or during a virtual machine migration. Example types of virtual machine data include raw, e.g., unprocessed data, compressed data, encrypted data, metadata, files and/or folders of a file system, or a pointer to a memory address of a memory device storing the virtual machine data. In some examples, virtual machine data can include part of, or the entirety of a virtual machine snapshot.

The dictionary 165 can be any data structure for storing, adding, removing, and/or querying a key or keys mapped to virtual machine data. One or more keys may be mapped to a single data block, or multiple data blocks of virtual machine data. A "mapping" or the state of being "mapped to" refers to associations between various keys and virtual machine data. The system can query the data structure using a key, to retrieve the data block associated with the key, or metadata for the data block.

A key to virtual machine data is an identifier to that data. A key may also be referred to as a name, attribute, or field, etc. The key mapped to a data block can be the output of a hash function when the data block or part of the data block is provided as input. For example, the key can be generated from only part of the beginning, middle, and/or end of the data block, or the entire data block itself.

Any of a variety of different hash functions with varying hash collision rates may be used to generate keys for data blocks. Although hash functions are described in the examples of key generation and (key, data block) mappings, it is understood that any of a variety of functions with different collision rates may be substituted according to different examples. Example hash functions include CRC-32 and its variants, SHA-256 and its variants, etc. The dictionary 165 may be structured, for example, in a manner that retains a mapping from more than one type of key to the same data. For example, the dictionary 165 can map from CRC-32(X) to X for virtual machine data X, as well as map from SHA-256(X) to X, while storing virtual machine data X only once.

Figure 6:
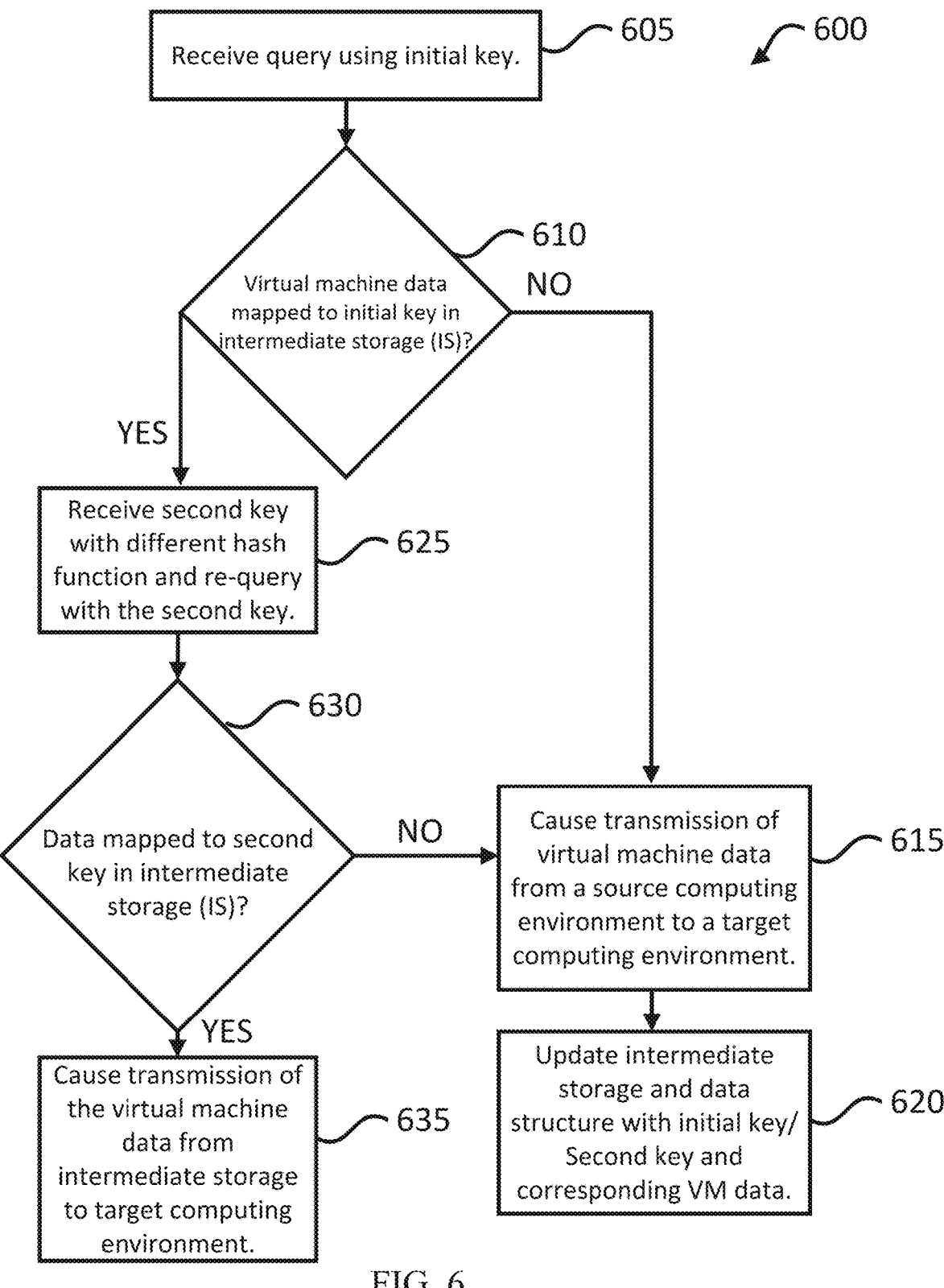
FIG. 6 is a flow chart of an example process of querying a data structure to determine the existence or absence of queried virtual machine data in intermediate storage, according to aspects of the disclosure.

A hash collision rate refers to the rate at which a hash function generates the same hash for two different inputs. In the context of using hashes of data blocks to generate keys, it is possible for the same key to be generated for two or more different data blocks. As a result, when this key is used to query the data structure, the system can potentially return the wrong data block intended or return no result at all. FIG. 6 is a flow diagram of an example process 600 for mitigating or eliminating hash collisions, according to aspects of the disclosure.

In some examples, keys may be generated from hashes for virtual machine data already generated as part of another process, such as error detection. During an error detection process, hashes are generated and compared between source and target computing environments to ensure that transmission did not result in corrupting the migrated data. Reusing previously generated hashes from virtual machine data can cut computation costs, particularly for resource-constrained source computing environments. In addition, upon determining the presence of corrupted data, the migration system can be configured to delete entries corresponding to the corrupted data from the dictionary 165 and the intermediate storage 170.

The system 100 can implement an interface, such as an Application Program Interface (API) for querying and updating the dictionary 165 and intermediate storage. For example, the dictionary 165 may be queried using a key, and in response to the query, the system 100 can provide a response. An example response can include one returning true or false if the key exists in the data structure.

Another example response can include returning the data block of virtual machine data mapped to the key, and/or other metadata associated with the data block and stored by the intermediate storage. Yet another example response can include returning null or an indication that the queried key is not mapped to a corresponding data block stored in the intermediate storage 170. An example response can also be a combination of other example responses, e.g., returning a value indicating the data block mapped to the queried key exists, as well as returning the virtual machine and any associated metadata. Examples of queries and responses are provided with reference to FIGS. 2 and 3.

A source computing environment can query the system to determine whether to perform a deduplication operation. For example, a source computing environment may check for the existence of virtual machine data by querying its key and receiving a response. If the response indicates that the virtual machine data already exists in the intermediate storage 170, then the source computing environment does not transmit the virtual machine data to the corresponding target computing environment. The computationally inexpensive query and response by the source computing environment and the system 100 replaces a redundant transmission of the virtual machine data and reduces the wasted network traffic load that would have occurred otherwise.

In another example, the target computing environment of a virtual machine migration can receive a key from the source computing environment and retrieve the data block of virtual machine data mapped to the received key from the intermediate storage 170 of the system 100 instead of the source computing environment. Potential bottlenecking caused by inadequate data transmission capabilities from environment-to-environment are mitigated by shifting the responsibility of transmission to the migration system 100. In some examples, target device 155 is configured to add entries to and/or read entries from, the dictionary 165.

Data deduplication can be performed as part of a background or foreground process, which may be triggered for example, periodically, or in response to changes in the migrating virtual machine. Data deduplication can be performed in response to determining the presence or absence of virtual machine data in the intermediate storage 170. Once a querying device determines that the dictionary 165 stores the desired data, the device may proceed to avoid resending the queried virtual machine data to the target computing environment.

When a querying device determines that the dictionary 165 does not contain the queried virtual machine data, the querying device may proceed with the deduplication operation of filling that entry into the dictionary 165 and/or transmitting that data to its counterpart target computing environment, thus improving the chances of successful deduplication later during migration.

As a virtual machine migration is a long process on the order of hours, days, or sometimes weeks, identifying virtual machine data to store and later serve from the intermediate storage 170 can save on multiple potential redundant transfers from source to target.

Common storage 180 can be implemented on one or more storage devices, e.g., disks, solid state drives, network-attached storage (NAS), storage area network (SAN) etc., and back contents of computing environment disks, such as target disks 160. The same virtual machine data may be written more than once to different disks, so the virtual machine data may be deduplicated by having the target disks backed by the common storage 180 implementing an internal deduplication mechanism. The common storage 180 may also serve as the backup for dictionary 165. For example, the common storage 180 may serve as the storage in which the dictionary 165 resides. The common storage 180 may be implemented on the same physical storage devices as the intermediate storage 170.

In some examples, virtual machine data is compressed for network transit, and decompressed at its target destination. For example, a device at a source computing environment may compress virtual machine data and determine whether the data is stored in the intermediate storage 170. If not, the source device can upload the compressed data to the intermediate storage 170. The common storage 180 can store the raw or compressed version of the virtual machine data. In some examples, the common storage 180 stores the raw version of the virtual machine data, while the intermediate storage 170 stores the compressed version. In this example, multiple forms of the same data can be accessible by source or target devices, without redundant recompressing/decompressing caused by the data being stored in one format but requested in another.

Figure 2:
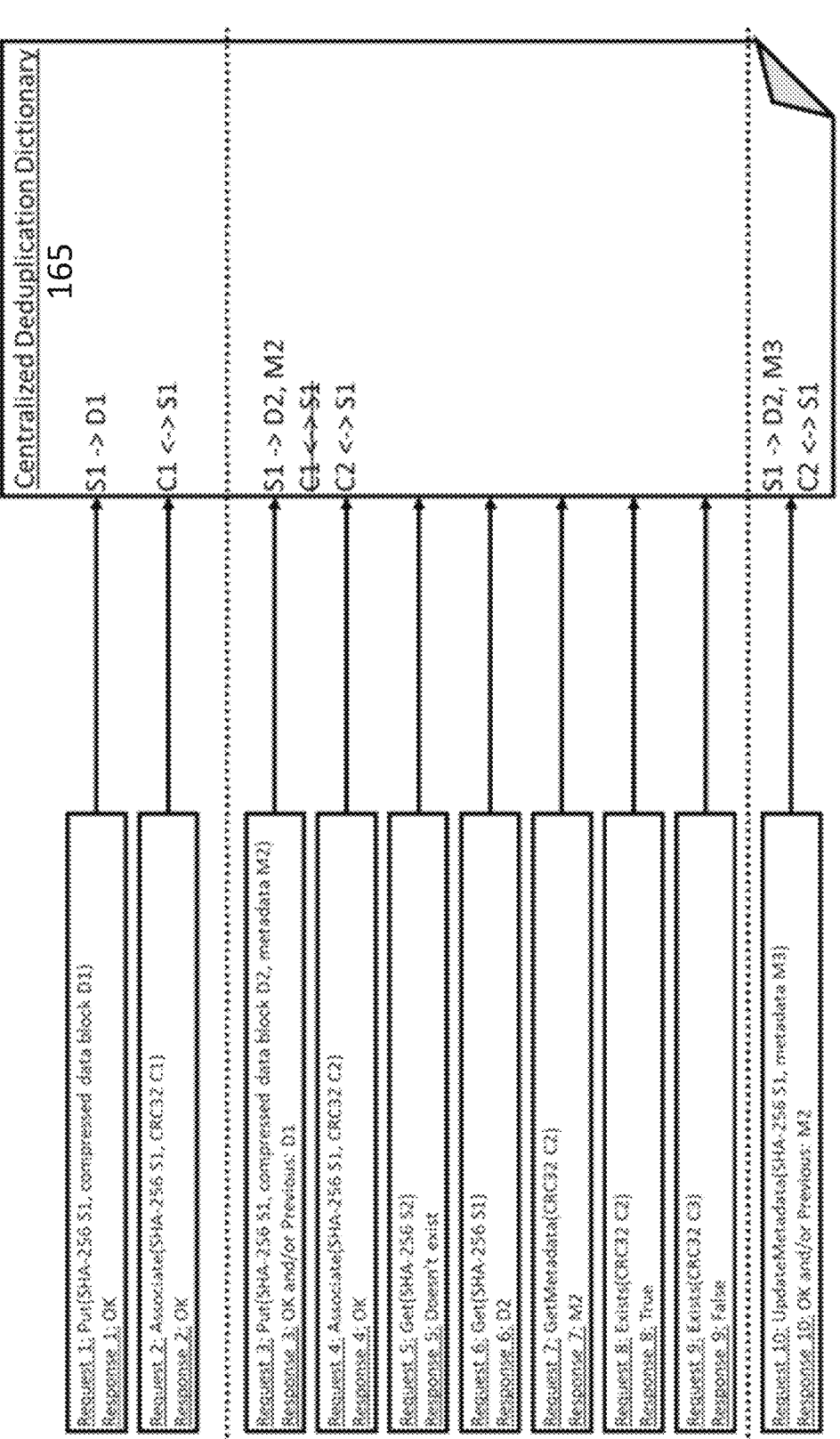
FIG. 2 illustrates an example centralized deduplication dictionary being populated, queried, and evacuated by the example migration system 100.

FIG. 2 illustrates an example centralized deduplication dictionary being populated, queried, and evacuated by the example migration system 100. Evacuation can refer to the elimination of data from memory or storage, e.g., by deletion or overwriting. The various requests illustrated in FIG. 2 are examples of how the dictionary 165 may be managed and updated by the system 100. The illustrated requests include various example commands, e.g., "Put," "Associate," "Get," etc., which may be defined in an API or other type of interface for accessing and managing a centralized deduplication dictionary and/or intermediate storage of virtual machine data. In some examples, the migration system 100 may be configured with more, fewer, or different commands for managing and accessing data.

Request 1 includes a command ("Put") defined with two arguments, a key S1 and a compressed data block D1, for adding a new entry to the dictionary 165. Compressed data block D1 is an example of virtual machine data that may be stored in the intermediate storage 170 of the migration system. The data block D1 is hashed using SHA-256 to generate the key S1. Because the key S1 does not already exist in the intermediate storage 170, the system 100 adds the key S1. As part of serving the request, the system can update internal data structures that may be part of or separate from the dictionary 165. These internal data structures include metadata about the entry, e.g., a creation timestamp. These internal data structures may be used for prioritization and/or evacuation operations, as described herein.

Request 2 includes a command ("Associate") defined with two arguments, key S1 and a new key CRC-32 C1, for adding the key C1 as a key for the data block mapped to the key S1. The key C1 generated by hashing the data block D1 using CRC-32. As the key S1 already exists in the dictionary 165, the system 100 stores a two-way association between keys C1 and S1, meaning that data mapped to S1 is considered mapped to the key C1, and vice versa.

Request 3 includes a command ("Put") defined with three arguments, key S1, compressed data block D2, and metadata M2. The system 100 can determine that the key S1 already exists in the dictionary, e.g., by querying S1, and update the key S1 to be mapped to the data block D2, as well as metadata M2. The system 100 can also delete the data block D1, as well as the existing association between keys S1 and C1. The existing association may be removed by the system 100 as the association may no longer be necessarily valid, although in some examples the association is maintained unless explicitly removed, e.g., through user input.

Request 4 includes an Associate command for associating the key S1 with a new CRC-32 key C2. As S1 exists in the dictionary 165, the system stores a two-way association between keys S1 and C2.

Request 5 includes a command ("Get") defined with one argument, key S2, for retrieving virtual machine data from intermediate storage mapped to the key S2 in the dictionary 165. The migration system 100 can query the dictionary 165, determine that the key S2 does not exist, and respond indicating the same, e.g., Response 5: "Doesn't exist."

Request 6 includes a Get command defined with one argument, key S1. The migration system 100 serves the request with compressed data block D2. As part of serving this request, the system 100 can update internal metadata tracking usage attributes for the virtual machine data requested. For example, the system can update the data block D2 to be the last recently used ("LRU") entry of the dictionary 165. As described herein and with reference to FIG. 4, the migration system 100 can process metadata relating to virtual machine data to determine what entries should be stored in intermediate storage 170 and/or at a cache layer.

Request 7 includes a command ("GetMetaData") defined with one argument, the key C2, for retrieving metadata for the data block D2 mapped to the key C2.

Request 8 includes a command ("Exists") defined with one argument, key C2, for determining whether virtual machine data from the intermediate storage stores virtual machine data mapped to the key C2. The system responds to Request 8 with "True."

Request 9 includes another Exists command with one argument, a CRC-32 C3, to which the system 100 responds with "False."

Request 10 includes a command ("UpdateMetadata") with two arguments, key S1, and metadata M3, for updating metadata associated with virtual machine data mapped to S1. In some examples, the system 100 responds with a confirmation of the update. The key S1 still points to data block D2, and the association between key S1 and key C2 is retained.

The system 100 can perform a routine cleanup process based on a predefined retention policy. For example, after a week of inactivity, the system can remove key S1, data block D2, metadata M3, and association C2⇔S1 from the dictionary 165.

Figure 3:
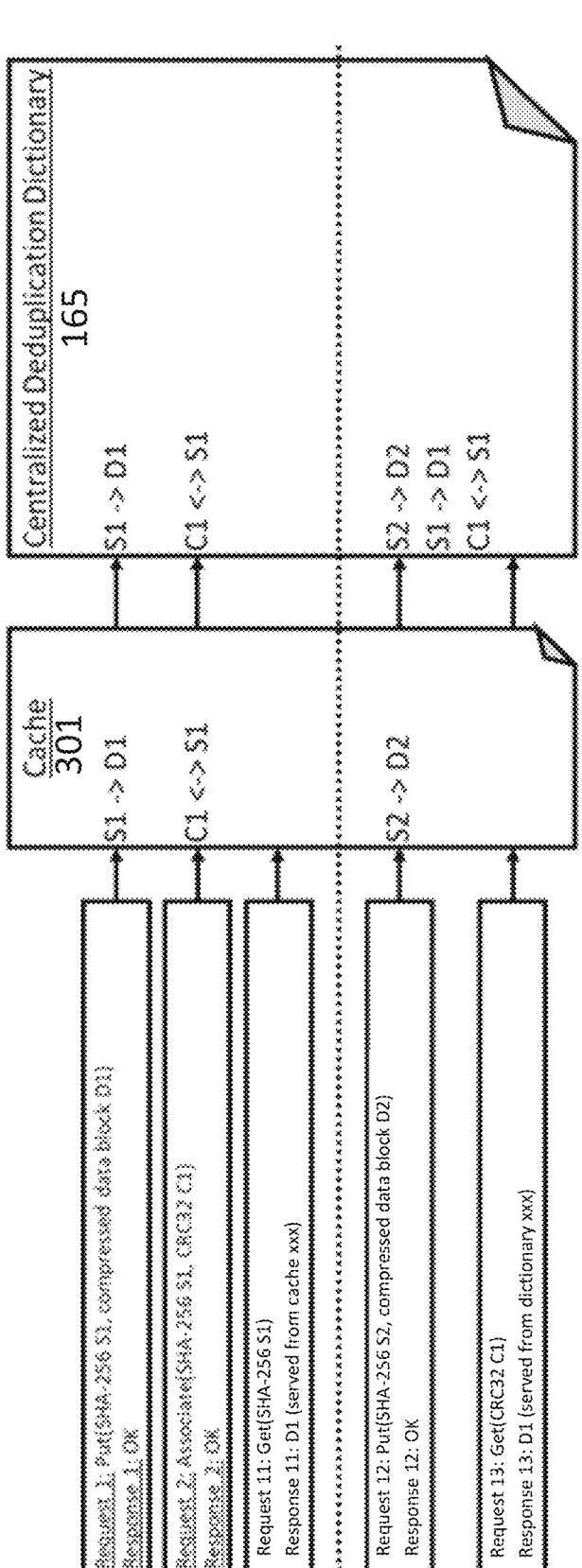
FIG. 3 is a block diagram of an example cache layer for the centralized deduplication dictionary.

FIG. 3 is a block diagram of an example cache layer 301 for the centralized deduplication dictionary 165. In some examples, cache layer 301 can be implemented, e.g., in memory or storage devices also serving as intermediate storage 170. In some examples, the cache layer 301 is implemented in RAM, while the intermediate storage 170 is implemented across one or more storage devices, such as solid-state drives. In some examples, the cache layer 301 can store a predetermined size of data, e.g., a predetermined size in which virtual machine data is migrated from source to destination. For example, the size of the cache layer 301 can be equal to a single data block, such that a second Put operation effectively overwrites the previously stored entry.

The cache layer 301 can serve as a proxy for incoming requests, in which the system 100 can update the cache layer 301 with virtual machine data and/or metadata to avoid forwarding the requests to the dictionary 165 itself. In this way, at least some requests can be served completely from the cache layer 301. Faster access can reduce response time for incoming queries, such as queries to commonly targeted virtual machine data.

Figure 4:
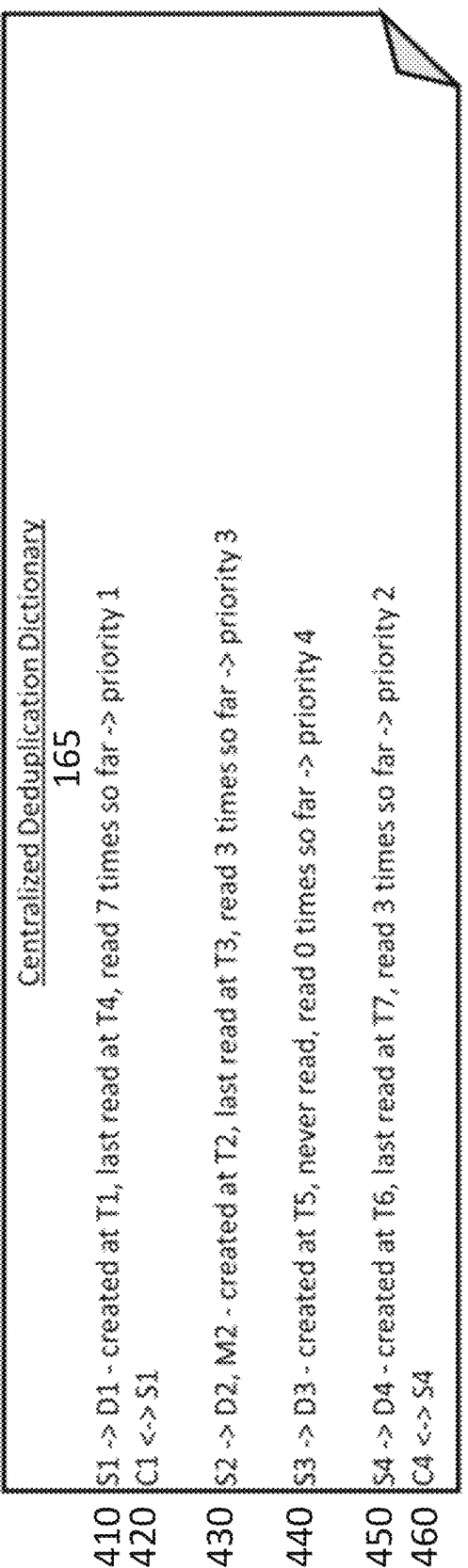
FIG. 4 illustrates an example of prioritizing and evacuating entries from a centralized deduplication dictionary, according to aspects of the disclosure.
Figure 4:
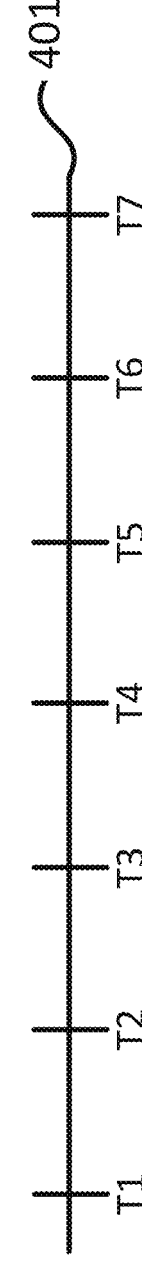

FIG. 4 illustrates an example of prioritizing and evacuating entries from a centralized deduplication dictionary 165, according to aspects of the disclosure. Prioritization can be implemented for determining what entries of the dictionary should remain in the cache layer and/or intermediate storage, to make best use of the available space according to one or more factors. Prioritization may be used, for example, when the cache layer size is limited and/or the cache layer cannot contain the entire dictionary. Prioritization can be implemented as described herein to speed up accessing data targeted by incoming queries, to reduce overall query time. Prioritization can also reduce storage costs for storing the dictionary, e.g., disk space and the cost to operate multiple disks to meet storage requirements.

The migration system 100 can also apply a prioritization process when determining what data to evacuate from the cache or the dictionary, for example when the allocation of storage or memory for the cache dictionary is met. Evacuation may occur, for example, on-the-fly when necessary to store incoming virtual machine data, and/or as part of a set of operations independent from virtual machine migration operations. When performed on-the-fly, the system can evacuate one or more entries when the space is necessary to make room for incoming entries. An on-the-fly evacuation may also occur when an existing entry is updated, requiring additional space to store.

Timeline 401 shows times T1-T7, for reference. The times T1-T7 can occur during a virtual machine migration. Entries 410, 430, 440, and 450 include varying different priority levels 1-4. Associations 420 and 460 are also shown.

Each stored entry can include internal associated metadata. The metadata can include values characterizing the entry itself, including its creation, usage, and life. Example fields stored in the metadata can include creation or modification time of the entry, last read time, number of times read, etc. Based on this metadata, each entry can be prioritized relative to other entries. The system can determine additional attributes of individual entries by processing metadata for currently stored entries. These additional attributes can include a use frequency, e.g., number of times the entry is used as a response to a query divided by a time interval, and which entry is the least recently used.

The exact prioritization process or mechanism to assign priority levels to the entries can vary from implementation-to-implementation. A prioritization process can be deterministic, probabilistic, or a combination of the two. In some examples, entries with a higher priority, e.g., priority level 1, 2, will only be evacuated from the dictionary 165 after low-priority entries are first removed. In some examples in which a cache layer is implemented, entries with a higher priority are more likely to be available to be served from the cache layer.

In one example prioritization process, prioritization can be assigned by sorting the entries, where the sorting is based on factors. These factors can include the highest number of times each entry was read within a certain interval, e.g., a week. Another example factor can be by creation time, for example where later entries are prioritized higher than earlier entries. In the example shown in FIG. 4, entry 430 has a priority of 3 while entry 450 has a priority of 2, because entry 430 and entry 450 were read the same number of times, but entry 450 is newer (T7 versus T3). Another example factor can be last read time. These factors can be weighted and combined or applied separately.

Sorting and metadata management can be implemented as part of or separate from the dictionary 165, for example as internal data structures and processes implemented by the migration system 100. Entries can also be represented as a linked list with elements sorted according to predetermined factors described herein.

Example Methods

Figure 5:
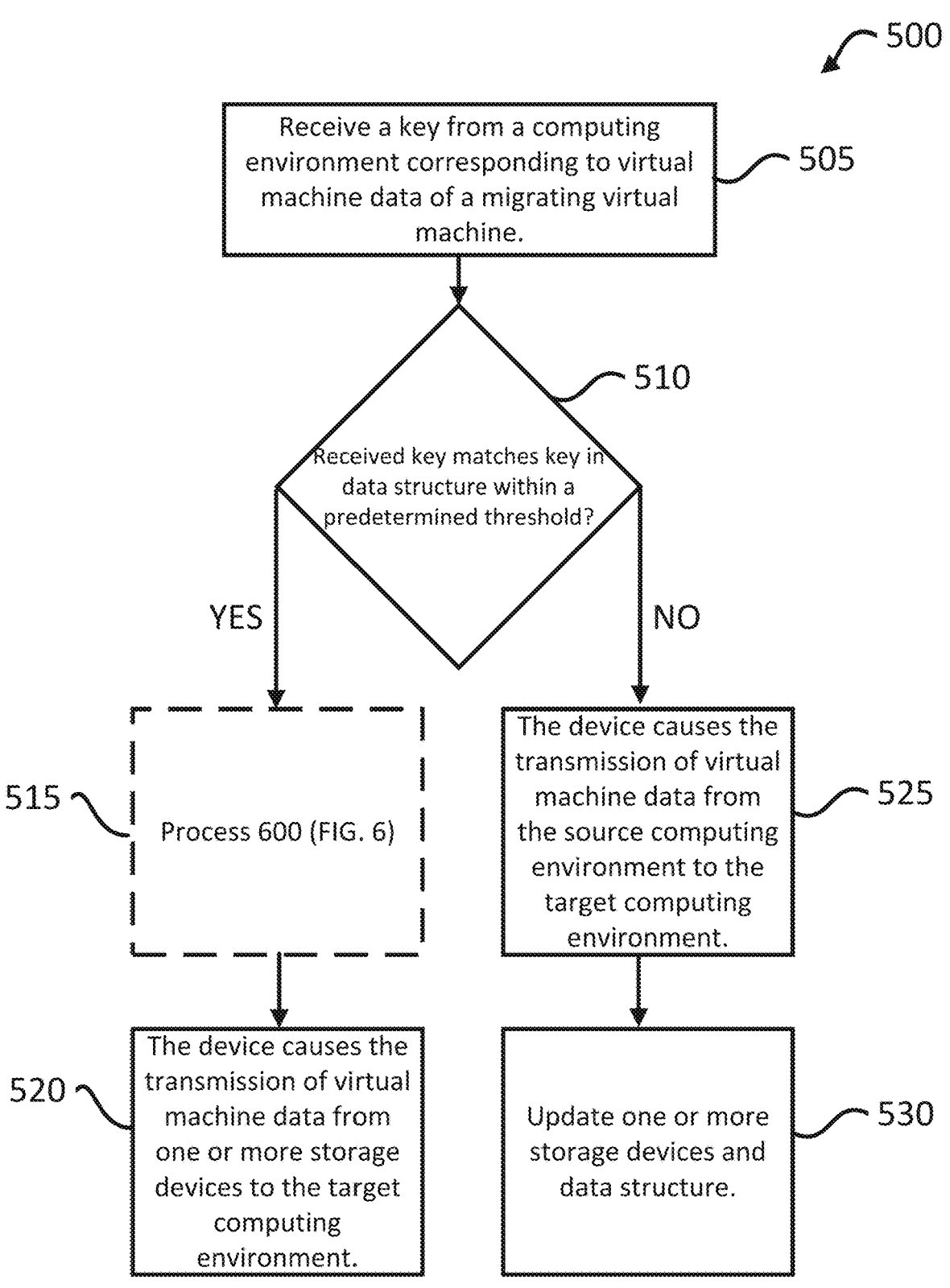
FIG. 5 is a flow diagram of an example process for querying a deduplication data structure, according to aspects of the disclosure.

FIG. 5 is a flow diagram of an example process 500 for querying a deduplication data structure, according to aspects of the disclosure. The data structure can be, for example, the centralized deduplication dictionary 165 as shown and described with reference to FIG. 1. The device described with reference to FIGS. 5 and 6 can be, for example, a device in a computing environment, such as the target device 155, a device in a source computing environment from which a virtual machine originates, and/or part of the migration system.

If multiple devices in different environments are configured to perform the process 500 and/or process 600, then the migration system can determine which device performs the process. The determination can be predetermined, e.g., to prefer appropriately configured devices part of the migration system, or to pick a device from either the source or target computing environment. The system can choose from the source or target computing environment based on, for example, geographic proximity to the one or more storage devices implementing the intermediate storage, bandwidth availability, etc.

According to block 505, the device receives a key from a computing environment corresponding to virtual machine data of a migrating virtual machine. The key can be generated as a hash of virtual machine data, or a portion of virtual machine data. The key can be generated by a device in a source or target computing environment, or by the migration system. In some examples the key is generated by the device performing the process 500.

According to decision block 510, the device determines whether the received key matches a key in the data structure within a predetermined threshold of similarity. The data structure can be the dictionary 165, as an example.

Two keys may match within a threshold of similarity, e.g., be different by zero or more characters. The threshold of similarity can be zero, meaning that the keys exactly match. The threshold of similarity may be greater than zero, meaning that the keys may be considered to match even if they deviate by a quantity of characters within the threshold.

If the received key matches a key in the data structure ("YES"), then according to block 515, the device can optionally perform the process 600 to verify that the positive result is not due to a hash collision.

According to block 520, the device causes the transmission of virtual machine data from one or more storage devices to the target computing environment. The one or more storage devices can at least partially implement the intermediate storage.

If the received key does not match a key in the data structure within a predetermined threshold of similarity ("NO"), then according to block 525, the device causes the transmission of virtual machine data from the source computing environment to the target computing environment. The source computing environment is the environment from which the virtual machine is migrating. According to block 530, the device updates one or more storage devices and the data structure with the new (key, virtual machine data) mapping.

FIG. 6 is a flow chart of an example process 600 of querying a data structure to determine the existence or absence of a queried virtual machine data in intermediate storage, according to aspects of the disclosure. In some examples, the system can mitigate error caused by hash collision during data deduplication by using multiple keys generated from different hash functions with varying hash collision rates. The data structure can be, for example, the centralized deduplication dictionary 165 as shown and described with reference to FIG. 1.

According to block 605, the device receives a query for virtual machine data in the intermediate storage using an initial key. The initial key can be generated using a hash function that has a higher rate of hash collision, but has the tradeoff of being less computationally expensive, e.g., fewer processor cycles, less memory, etc., to generate. An example of a hash function for generating the initial key is CRC-32. The query can be received by a querying device, which may be part of a source computing environment, a target computing environment, or part of the migration system itself.

According to decision block 610, the device determines whether virtual machine data mapped to the initial key is stored in the intermediate storage. If the system determines that mapped virtual machine data does not exist ("NO" from decision block 610), then according to block 615, the device causes virtual machine data to be transmitted from a source computing environment to a target computing environment.

According to block 620, the device updates intermediate storage and the data structure with the initial key and/or the second key and corresponding virtual machine data. In some examples, as part of the updating, the querying device can send a "Put" command, as shown, and described with reference to FIGS. 2 and 3.

According to block 625, if the query with the initial key returns an indication that the virtual machine data mapped to the initial key is stored in the intermediate storage ("YES" from decision block 610), the device can receive a second key using a different hash function and re-query the data structure using the second key.

The second key can be generated using a different hash function that is more computationally expensive, but also has a smaller hash collision rate. For example, if the hash function to generate the initial key is CRC-32, an example hash function with a lower hash collision rate relative to CRC-32 is SHA-256. The hash functions can be selected such that the cross-probability of a collision, e.g., the probability that the two hash functions will generate collisions for the same input, is below a predetermined tolerance, e.g., statistically improbable, or impossible (zero percent chance).

According to decision block 630, the querying device determines whether virtual machine data mapped to the second key is stored in the intermediate storage. If the querying device determines that mapped virtual machine data does not exist ("NO" from decision block 630), then the system can take action according to block 615 and block 620, e.g., transmitting the virtual machine data to a target computing environment or intermediate storage and updating the data structure with the new (key, virtual machine data) mapping. The (key, virtual machine data) mapping can include each key generated for the virtual machine data, e.g., both the initial key and the second key, if a second key was generated.

According to block 635, if the query with the second key returns an indication that the virtual machine data mapped to the initial key is stored in the intermediate storage ("YES" from decision block 630), then the querying device can send the second key, the initial key, or both the second key and the initial key to a target computing environment for retrieving the mapped virtual machine data stored in the intermediate storage. Both the second and the initial key should point to the same value, rather than, for example, both keys merely existing in the dictionary but pointing to different values.

The success of the query with the second key is a strong indicator that, with high probability, a deduplication operation may be successfully performed. The process 600 of FIG. 6 can have the effect of balancing between added round-trip costs between the querying device and the data structure maintaining the (key, virtual machine data) mapping, with the computational costs of using a more computationally expensive hash operation, e.g., SHA-256, from the outset of performing the query.

In some examples, the device can retrieve the mapped virtual machine data from the intermediate storage and compare at least a portion of the data with a known ground-truth sample of the requested virtual machine data. This comparison challenge can reduce the probability of a deduplication operation occurring despite not actually having the correct matching data. The comparison challenge may occur after receiving a positive indication of the existence of mapped virtual machine data in the intermediate storage, e.g., after the steps of process 500 described with reference to blocks 505 or 510 of FIG. 5 are performed.

The comparison challenge allows devices in a target computing environment to independently test the validity of the data received from the intermediate storage, without relying on the migration system itself. Instead, the target computing environment can calculate a hash of its own from the received data and request a corresponding hash from the source computing environment, bypassing the need to include the migration system in the verification.

For example, source environment A claims to have a data block for virtual machine V1 with hash X1. Hash X1 is not yet in the system, and so the target environment requests an upload to the system. Source environment B claims to have a data block for virtual machine V2 with hash X1. The target environment challenges source environment B to prove that it has the block with hash X1, by requesting specific bytes in the block, which is a small upload from a randomly chosen location. Only upon verification of this data challenge will the target environment assume that the data from the source environment B is a duplicate. The determination that the block is a duplicate prevents duplicate uploading to the system. Hash challenges keeps data from the source environments private to target environments issuing challenges, while allowing for a check to prevent duplicate uploading.

In some examples, the uploading to intermediate storage and the querying of virtual machine data can be performed by respective devices in the source and target computing environments corresponding to a migrating virtual machine. For instance, a source computing device can check the dictionary for the presence of an entry for some virtual machine data. If there is not already an entry, the source device can cause the virtual machine data to be uploaded. If the entry exists, the source device can generate another key using another hash function and query the migration system against that key.

On the target computing environment side, a target device can read the data from intermediate storage for performing data verification, updating the metadata with any additional information. The target device can receive virtual machine data from the intermediate storage, compute a hash of the virtual machine data, and compare the hash against a hash provided from the source computing environment. If the hashes do not match, then the migration cycle fails. If the check is successful, then the target device can write the virtual machine data to the target disks. In some examples, only a portion of the virtual machine data is hashed and compared with the same portion of virtual machine data hashed by the source computing environment.

Example Computing Environment

Figure 7:
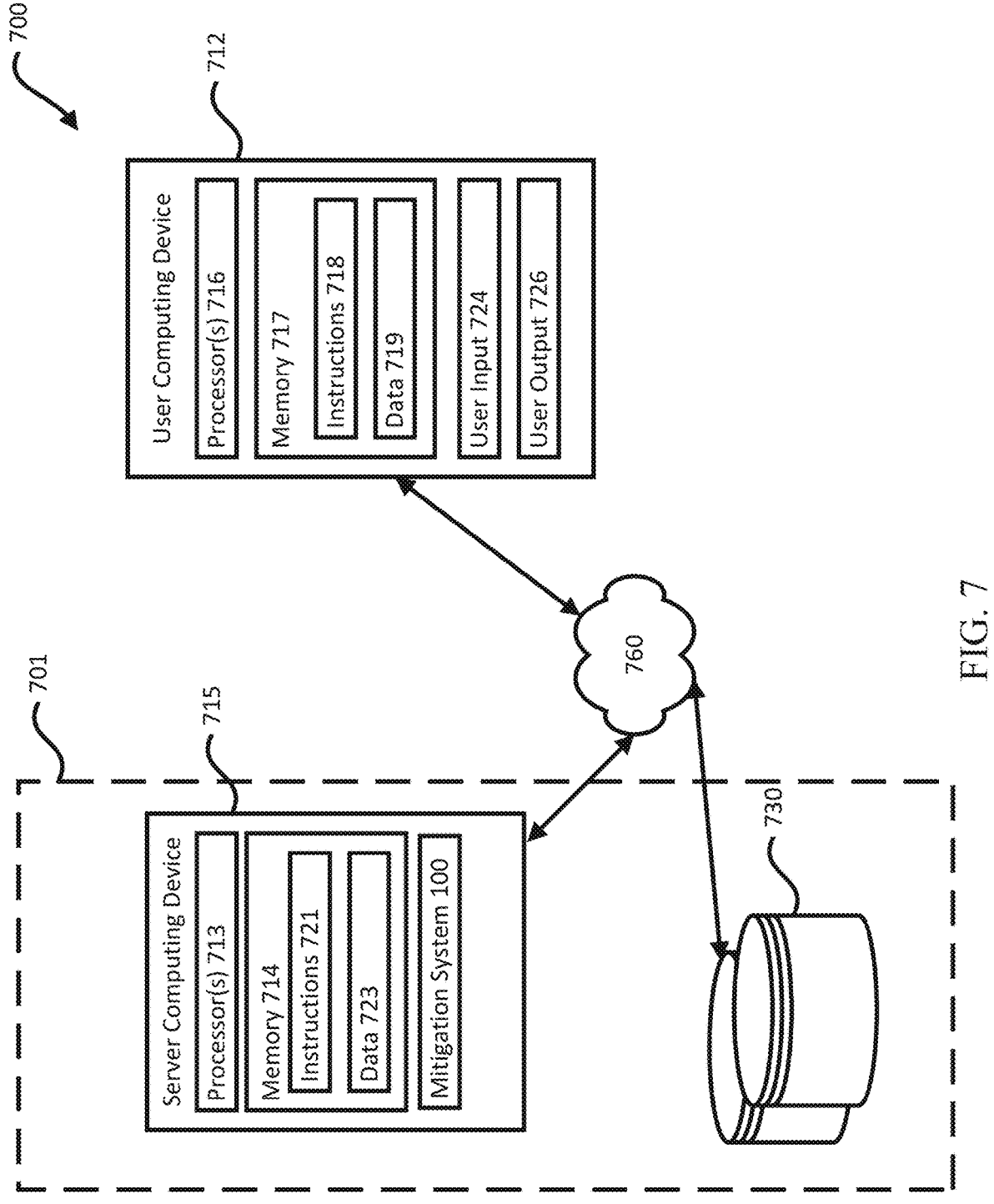
FIG. 7 is a block diagram of an example environment for implementing the migration system.

FIG. 7 is a block diagram of an example environment 700 for implementing the migration system 100. The system 100 can be implemented on one or more devices having one or more processors in one or more locations, such as in server computing device 715. User computing device 712 and the server computing device 715 can be communicatively coupled to one or more storage devices 730 over a network 760. The storage device(s) 730 can be a combination of volatile and non-volatile memory and can be at the same or different physical locations than the computing devices 712, 715. For example, the storage device(s) 730 can include any type of non-transitory computer readable medium capable of storing information, such as a hard-drive, solid state drive, tape drive, optical storage, memory card, ROM, RAM, DVD, CD-ROM, write-capable, and read-only memories.

During replication-based migration, the migration system 100 migrates a source virtual machine by taking snapshots of the source virtual machine, potentially while the source virtual machine is still running in the source computing environment. Migration occurs over one or more migration cycles. The number and occurrence of migration cycles can depend on how the migration service is configured.

A migration cycle can refer to the completion of a transfer of a virtual machine snapshot, or data characterizing changes between a current and a previous snapshot, to the target computing environment. The migration cycles of a replication-based migration can be any of a variety of types, including: first sync, in which the entire state of the source virtual machine is captured as a virtual machine snapshot; periodical, in which data characterizing a difference between a current and a previous state of the source virtual machine is captured in accordance with a schedule generated by the migration system 100; a user-triggered migration cycle, in which a migration cycle occurs in response to user input; and a cut-over operation, in which the source virtual machine is shut down and the last snapshot of the source virtual machine is copied and sent to the target computing environment.

During the migration but before the cut-over operation, the migration system 100 can maintain a test clone of a target virtual machine, matching the state and settings of the source virtual machine at a corresponding migration cycle. The migration service may maintain multiple test clones for a virtual machine, each corresponding to a respective migration cycle. The multiple test clones can correspond to the same migration cycle, in some examples. Each test clone has a respective set of target virtual machine settings for use while deployed in the test environment.

Although described herein in some examples with reference to a single virtual machine, it is understood that the migration service is configured to perform mass migration, in which multiple virtual machines are migrated from one or more source computing environments to one or more target computing environments. Different virtual machines may be targeted for migration at different times, and collectively are referred to as migration waves.

In some examples, the migration system as described herein can implement live migration of virtual machines. In a live migration, the memory state, e.g., RAM state of each migrating virtual machine is copied, and the network connectivity of each migrating virtual machine is retained, such that the virtual machine is migrated without disconnecting the service running on the virtual machine. As part of performing a live migration, the migration system can maintain and generate test clones for migrating virtual machines, up until a cut-over operation is performed. It is understood that references to migration may be substituted with live migration, without loss of generality.

The server computing device 715 can include one or more processors 713 and memory 714. The memory 714 can store information accessible by the processor(s) 713, including instructions 721 that can be executed by the processor(s) 713. The memory 714 can also include data 723 that can be retrieved, manipulated, or stored by the processor(s) 713. The memory 714 can be a type of non-transitory computer readable medium capable of storing information accessible by the processor(s) 713, such as volatile and non-volatile memory. The processor(s) 713 can include one or more central processing units (CPUs), graphic processing units (GPUs), field-programmable gate arrays (FPGAs), and/or application-specific integrated circuits (ASICs), such as tensor processing units (TPUs).

The instructions 721 can include one or more instructions that when executed by the processor(s) 713, causes the one or more processors to perform actions defined by the instructions. The instructions 721 can be stored in object code format for direct processing by the processor(s) 713, or in other formats including interpretable scripts or collections of independent source code modules that are interpreted on demand or compiled in advance. The instructions 721 can include instructions for implementing the system 100 consistent with aspects of this disclosure. The system 100 can be executed using the processor(s) 713, and/or using other processors remotely located from the server computing device 715.

The data 723 can be retrieved, stored, or modified by the processor(s) 713 in accordance with the instructions 721. The data 723 can be stored in computer registers, in a relational or non-relational database as a table having a plurality of different fields and records, or as JSON, YAML, proto, or XML documents. The data 723 can also be formatted in a computer-readable format such as, but not limited to, binary values, ASCII, or Unicode. Moreover, the data 723 can include information sufficient to identify relevant information, such as numbers, descriptive text, proprietary codes, pointers, references to data stored in other memories, including other network locations, or information that is used by a function to calculate relevant data.

The user computing device 712 can also be configured like the server computing device 715, with one or more processors 716, memory 717, instructions 718, and data 719. The user computing device 712 can also include a user output 726, and a user input 724. The user input 724 can include any appropriate mechanism or technique for receiving input from a user, such as keyboard, mouse, mechanical actuators, soft actuators, touchscreens, microphones, and sensors.

The server computing device 715 can be configured to transmit data to the user computing device 712, and the user computing device 712 can be configured to display at least a portion of the received data on a display implemented as part of the user output 726. The user output 726 can also be used for displaying an interface between the user computing device 712 and the server computing device 715. The user output 726 can alternatively or additionally include one or more speakers, transducers or other audio outputs, a haptic interface or other tactile feedback that provides non-visual and non-audible information to the user of the user computing device 712.

Although FIG. 7 illustrates the processors 713, 716 and the memories 714, 717 as being within the computing devices 715, 712, components described in this specification, including the processors 713, 716 and the memories 714, 717 can include multiple processors and memories that can operate in different physical locations and not within the same computing device. For example, some of the instructions 721, 718 and the data 723, 719 can be stored on a removable SD card and others within a read-only computer chip. Some or all of the instructions and data can be stored in a location physically remote from, yet still accessible by, the processors 713, 716. Similarly, the processors 713, 716 can include a collection of processors that can perform concurrent and/or sequential operation. The computing devices 715, 712 can each include one or more internal clocks providing timing information, which can be used for time measurement for operations and programs run by the computing devices 715, 712.

The server computing device 715 can be configured to receive requests to process data from the user computing device 712. For example, the environment 700 can be part of a computing platform 701 configured to provide a variety of services to users, through various user interfaces and/or APIs exposing the platform services.

The devices 712, 715 can be capable of direct and indirect communication over the network 760. The devices 715, 712 can set up listening sockets that may accept an initiating connection for sending and receiving information. The network 760 itself can include various configurations and protocols including the Internet, World Wide Web, intranets, virtual private networks, wide area networks, local networks, and private networks using communication protocols proprietary to one or more companies. The network 760 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 760, in addition or alternatively, can also support wired connections between the devices 712, 715, including over various types of Ethernet connection.

Although a single server computing device 715 and user computing device 712, are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for migration of a virtual machine from a source computing environment to a target computing environment, the system comprising one or more processors and one or more intermediate storage devices between the source computing environment and the target computing environment, the one or more processors configured to:

receive a key corresponding to virtual machine data to be transmitted to from the source computing environment to the target computing environment;

access a data structure having a plurality of entries mapping a plurality of different keys with a plurality of units of virtual machine data stored in the one or more intermediate storage devices, wherein the plurality of different keys includes a first key generated for a first unit of the virtual machine data based on a first hash function having a first collision rate, and a second key generated for the first unit of the virtual machine data based on a second hash function different from the first hash function;

determine, using the data structure, that the received key matches a key of the plurality of different keys in the data structure within a predetermined threshold of similarity; and in response to at least the determination, cause the virtual machine data to be transmitted from the one or more intermediate storage devices to the target computing environment.

2. The system of claim 1, wherein the virtual machine is hosted in the source computing environment, and wherein the one or more processors are further configured to:

determine that the received key does not match a key stored in the data structure within the predetermined threshold of similarity, and in response, cause the virtual machine data to be transmitted from the source computing environment to the target computing environment;

update the one or more storage devices to store the virtual machine data to be transmitted; and update the data structure to map the received key to the virtual machine data to be transmitted.

3. The system of claim 1, wherein the one or more processors are further configured to:

determine that the received key does not match a key stored in the data structure, and in response cause the virtual machine data to be transmitted to the one or more storage devices; and update the data structure to map the received key to the virtual machine data to be transmitted.

4. The system of claim 3, wherein the one or more processors are further configured to:

receive a query for the virtual machine data to be transmitted, the query comprising a key; and respond to the query with a unit of the virtual machine data stored in the one or more intermediate storage devices and mapped to the key in the query.

5. The system of claim 1, wherein the one or more processors are further configured to:

populate a cache layer storing one or more entries of the data structure, each entry comprising one or more keys and respective data mapped to the one or more keys, wherein in populating the cache layer, the one or more processors are configured to prioritize the one or more entries of the data structure for caching based on values for usage attributes of the virtual machine data stored in the one or more storage devices.

6. The system of claim 1, wherein the first key in the data structure is output of the first hash function receiving at least part of the first unit of the virtual machine data as input, and the second key in the data structure is output of the second hash function receiving at least part of the first unit of the virtual machine data as input.

7. The system of claim 6, wherein a cross-probability of a hash collision occurring on the first unit of the virtual machine data as input in both the first hash function and the second hash function is below a predetermined tolerance.

8. The system of claim 1, wherein the key is received from a querying device from either the source computing environment or the target computing environment.

9. The system of claim 1, wherein the system comprises one or more second storage devices, and wherein the one or more processors are further configured to:

determine that the virtual machine data to be transmitted is stored in the target computing environment and in the one or more intermediate storage devices, and in response to the determination, cause the virtual machine data to be transmitted to be stored only in the one or more second storage devices.

10. A method for migration of a virtual machine, the method comprising:

receiving, by one or more processors, a key corresponding to virtual machine data to be transmitted from a source computing environment to a target computing environment;

accessing, by the one or more processors, a data structure having a plurality of entries mapping a plurality of different keys with a plurality of units of virtual machine data stored in one or more intermediate storage devices between the source computing environment and the target computing environment, wherein the plurality of different keys includes a first key generated for a first unit of the virtual machine data based on a first hash function having a first collision rate, and a second key generated for the first unit of the virtual machine data based on a second hash function different from the first hash function;

determining, by the one or more processors and using the data structure, that the received key matches a key of the plurality of different keys in the data structure within a predetermined threshold of similarity; and in response to at least the determining, causing the virtual machine data to be transmitted from the one or more intermediate storage devices to the target computing environment.

11. The method of claim 10, wherein the virtual machine is hosted in the source computing environment, and wherein the method further comprises:

determining, by the one or more processors, that the received key does not match a key stored in the data structure within the predetermined threshold of similarity, and in response, causing the virtual machine data to be transmitted from the source computing environment to the target computing environment;

updating, by the one or more processors, the one or more storage devices to store the virtual machine data to be transmitted; and updating, by the one or more processors, the data structure to map the received key to the virtual machine data to be transmitted.

12. The method of claim 10, further comprising:

determining, by the one or more processors, that the received key does not match a key in the data structure within the predetermined threshold of similarity, and in response to causing the virtual machine data to be transmitted to be stored in the one or more intermediate storage devices; and updating, by the one or more processors, the data structure to map the received key to the virtual machine data to be transmitted.

13. The method of claim 12, further comprising:

receiving, by the one or more processors, a query for virtual machine data to be transmitted, the query comprising a key; and responding, by the one or more processors, to the query with the virtual machine data stored in the one or more storage devices and mapped to the key in the query.

14. The method of claim 10, further comprising:

populating, by the one or more processors, a cache layer storing one or more entries of the data structure, each entry comprising one or more keys and respective data mapped to the one or more keys, wherein populating the cache layer comprises prioritizing the one or more entries of the data structure for caching based on values for usage attributes of the virtual machine data stored in the one or more storage devices.

15. The method of claim 10, wherein the first key in the data structure is output of the first hash function receiving at least part of the first unit of the virtual machine data as input, and the second key in the data structure is output of the second hash function receiving at least part of the first unit of the virtual machine data as input.

16. The method of claim 15, wherein a cross-probability of a hash collision occurring on the first unit of virtual machine data as input in both the first hash function and the second hash function is below a predetermined tolerance.

17. One or more non-transitory computer-readable storage media encoding instructions that are operable, when executed by one or more processors, to cause the one or more processors to perform operations comprising:

receiving, by the one or more processors, a key corresponding to virtual machine data to be transmitted from a source computing environment to a target computing environment;

accessing, by the one or more processors, a data structure having a plurality of entries mapping a plurality of different keys with a plurality of units of virtual machine data stored in one or more intermediate storage devices between the source computing environment and the target computing environment, wherein the plurality of different keys includes a first key generated for a first unit of the virtual machine data based on a first hash function having a first collision rate, and a second key generated for the first unit of the virtual machine data based on a second hash function different from the first hash function;

determining, by the one or more processors and using the data structure, that the received key matches a key of the plurality of different keys in the data structure within a predetermined threshold of similarity; and in response to at least the determining, causing the virtual machine data to be transmitted from the one or more intermediate storage devices to the target computing environment.

18. The computer-readable storage media of claim 17, wherein the virtual machine is hosted in the source computing environment, and wherein the operations further comprise:

determining, by the one or more processors, that the received key does not match a key stored in the data structure within the predetermined threshold of similarity, and in response, causing the virtual machine data to be transmitted from the source computing environment to the target computing environment;

updating, by the one or more processors, the one or more storage devices to store the virtual machine data to be transmitted; and updating, by the one or more processors, the data structure to map the received key to the virtual machine data to be transmitted.

* * * * *